(12) United States Patent
Ebihara et al.

(10) Patent No.: US 6,985,874 B1
(45) Date of Patent: Jan. 10, 2006

(54) SYSTEM OF ORDERING AND DELIVERING MERCHANDISE IN ELECTRONIC MALL AND METHOD THEREOF

(75) Inventors: Toru Ebihara, Sagamihara (JP); Kazuhiro Endoh, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/604,246

(22) Filed: Jun. 27, 2000

(30) Foreign Application Priority Data

Jun. 29, 1999 (JP) .................................. 11-183090

(51) Int. Cl.
*G06F 17/60* (2006.01)
(52) U.S. Cl. ...................................................... 705/26
(58) Field of Classification Search ................. 705/26, 705/27
See application file for complete search history.

(56) References Cited

U.S. PATENT DOCUMENTS

| | | | | |
|---|---|---|---|---|
| 5,197,009 A | * | 3/1993 | Hoffman et al. | 701/200 |
| 5,237,323 A | * | 8/1993 | Saito et al. | 340/995.18 |
| 5,710,887 A | * | 1/1998 | Chelliah et al. | 395/226 |
| 5,948,040 A | * | 9/1999 | DeLorme et al. | 701/201 |
| 5,963,948 A | * | 10/1999 | Shilcrat | 707/100 |
| 6,055,536 A | * | 4/2000 | Shimakawa et al. | 707/101 |
| 6,108,639 A | * | 8/2000 | Walker et al. | 705/26 |
| 6,128,600 A | * | 10/2000 | Imamura et al. | 705/27 |
| 6,199,099 B1 | * | 3/2001 | Gershman et al. | 709/203 |
| 6,324,522 B2 | * | 11/2001 | Peterson et al. | 705/28 |
| 6,336,100 B1 | * | 1/2002 | Yamada | 705/26 |
| 6,381,582 B1 | * | 4/2002 | Walker et al. | 705/26 |
| 2001/0013007 A1 | | 8/2001 | Tsukuda | 705/8 |
| 2002/0016726 A1 | * | 2/2002 | Ross | 705/7 |
| 2002/0027981 A1 | * | 3/2002 | Bedrosian et al. | 379/201.08 |
| 2002/0038261 A1 | * | 3/2002 | Kargman et al. | 705/26 |
| 2002/0111914 A1 | * | 8/2002 | Terada et al. | 705/60 |

FOREIGN PATENT DOCUMENTS

| | | | | |
|---|---|---|---|---|
| EP | 0753836 | | * | 1/1997 |
| JP | 362073375 | A | * | 4/1987 |
| JP | 10-162065 | | | 6/1995 |
| JP | 408068657 | A | * | 3/1996 |
| JP | 08-329143 | | | 12/1996 |

(Continued)

OTHER PUBLICATIONS

No Author, "GE Supply Net Now Available To All Customers; Real-Time, On-line Service Makes Ordering Easier, More Efficient", Business Wire, Nov. 19, 1998, Retrieved from Dialog File: 16; Acc#: 05964020.*

*Primary Examiner*—Wynn W. Coggins
*Assistant Examiner*—Naeem Haq
(74) *Attorney, Agent, or Firm*—Mattingly, Stanger, Malur & Brundidge, P.C.

(57) ABSTRACT

A system of ordering and delivering merchandise by accepting order of merchandise from any customer through a home page or a virtual store concerning sales of merchandise and constructed on a network by a sales merchant and through the network and delivering the ordered merchandise to a delivery destination designated by the customer on the basis of map information. A map having a dealer of a neighborhood of the delivery destination is retrieved on the basis of the address information of the customer in response to customer's selection of the dealer as a delivery destination when order of the merchandise is accepted from the customer. The dealer is determined as a delivery destination of the merchandise by the customer while the retrieved map is displayed on the home page or the virtual store.

5 Claims, 10 Drawing Sheets

FOREIGN PATENT DOCUMENTS

| | | | |
|---|---|---|---|
| JP | 9245105 | | 9/1997 |
| JP | A-9-288696 | | 11/1997 |
| JP | 410069580 A | * | 3/1998 |
| JP | 10214284 | | 8/1998 |
| JP | A-10-214284 | | 8/1998 |
| JP | A-10-224549 | | 8/1998 |
| JP | 10-307995 | | 11/1998 |
| JP | 02001338207 A | * | 12/2001 |
| JP | 020013388254 A | * | 12/2001 |
| JP | 02002251397 A | * | 9/2002 |
| JP | P2002-251397 A | * | 9/2002 |
| JP | 2002333832 A | * | 11/2002 |

* cited by examiner

MERCHANDISE RECEIPT

PAYMENT OF THE CHARGE

SELECTION OF THE CONVENIENCE STORE OF THE NEIGHBORHOOD

DETAILED INFORMATION OF THE CONVENIENCE STORE

CONFIRMATION OF THE CONTENTS

COPY FOR THE MERCHANT

| FOR THE MERCHANT |
|---|
| CUSTOMER NUMBER 098-012345678 |
| NAME : |
| ADDRESS : |
| |
| MERCHANDISE : 1. |
|                : 2. |
| QUANTITY : COMPLETE SET |
| CHARGE : |
| PAYMENT : CONVENIENCE STORE 24 |
| DELIVERY : CONVENIENCE STORE 24 |
| DELIVERY DAY : |
| REMARKS : |

FIG. 12

COPY OF THE CUSTOMER

FOR CUSTOMER CONFIRMATION
RECEPTION NUMBER :
CUSTOMER NUMBER 098-012345678
NAME :
ADDRESS :

MERCHANDISE : 1.
: 2.
CHARGE :
PAYMENT : CONVENIENCE STORE 24
DELIVERY : CONVENIENCE STORE 24
THE PREARRANGED DAY OF DELIVERY :
REMARKS :

FIG. 13

COMMUNICATION TABLE FOR THE CONVENIENCE STORE

FOR THE CONVENIENCE STORE
CUSTOMER NUMBER 098-012345678
NAME :
ADDRESS :

MERCHANDISE : 1.
: 2.
QUANTITY : COMPLETE SET
CHARGE :
PAYMENT : CONVENIENCE STORE 24
DELIVERY : CONVENIENCE STORE 24
DELIVERY DAY :
RECEPTION :
SOURCE OF FORWARDING :
REMARKS :

SYSTEM OF ORDERING AND DELIVERING MERCHANDISE IN ELECTRONIC MALL AND METHOD THEREOF

BACKGROUND OF THE INVENTION

The present invention relates to a system of ordering and delivering merchandise and a method of ordering and delivering merchandise. Particularly it relates to a system of ordering and delivering merchandise and a method of ordering and delivering merchandise for on-line shopping in which merchandise are sold by mail order in virtual stores opened on networks such as Internet.

On-line shopping systems for introducing merchandise on home pages or virtual stores through networks such as Internet and selling the merchandise by mail order have been popularized with the increase of the number of persons using these networks. Clients order such merchandise through the networks. For example, such systems are disclosed in JP-A-9-288696 and JP-A-10-224549.

JP-A-10-214284 has proposed a system of ordering and delivering merchandise for such on-line shopping, in which a destination address of merchandise can be selected from the address of a client and the address of a merchandise relay station such as a convenience store near the client's address in order to facilitate delivery of merchandise to the client and improve efficiency in forwarding merchandise.

The number of convenience stores has increased recently. A lot of convenience stores have been opened newly but a lot of convenience stores have been shut up. Much time is required for registering information of such newly opened and shut-up shops as a database in the form of map information, or the like. Selection of a convenience store of a neighborhood on the basis of information in the database sometimes might result in the client's being compelled to inconvenience.

It is therefore preferable that a convenience store optimal to the client can be selected on the basis of the newest state of convenience stores when the client selects a convenience store of a neighborhood as a merchandise relay station.

When a specific convenience store is to be designated, it is difficult to examine the store name, address and telephone number of the convenience store and input the information from a terminal. Even if the address and store name of the convenience store can be received from the terminal, it is difficult for the client to confirm instantly that the convenience store is the just one designated by the client.

If a convenience store can provide information of the convenience store itself to a client when the client orders or receives merchandise, an advertising effect can be expected.

On the other hand, addition of convenience stores' addresses as destination addresses of merchandise might make sales merchants' management so complex that there is a possibility of lowering the service quality.

SUMMARY OF THE INVENTION

An object of the present invention is to provide a system and method of ordering and delivering merchandise, in which a specific merchandise relay station can be selected from map information when a merchandise relay station is selected.

Another object of the present invention is to provide a system and method of ordering and delivering merchandise, in which information of a convenience store itself convenient to a client can be provided to the client upon ordering or receiving merchandise.

A further object of the present invention is to provide a system and method of ordering and delivering merchandise, in which management is not made so complex to sales merchants that lowering of service can be avoided.

According to an aspect of the present invention, there is provided a system of ordering and delivering merchandise by accepting order of merchandise from any customer through a home page or a virtual store concerning sales of merchandise and constructed on a network by a sales merchant and through the network and delivering the ordered merchandise to a delivery destination designated by the customer so that the delivery destination of the merchandise can be selected by the customer, the system comprising a map information unit for holding systematized data of a plurality of maps as map information; a dealer information unit for storing dealer information concerning dealers or depositories capable of dealing or mediating merchandise and addresses of the dealers or depositories; a map information display unit by which the plurality of maps can be retrieved; a unit for searching for a map having at least a dealer or depository in the neighborhood of the customer in the region of the map on the basis of the address information of the customer in response to a customer's selection request of a dealer as a delivery destination of the merchandise when the customer's order is accepted; and a unit for determining a dealer or depository to be selected by the customer as a delivery destination of the merchandise based on the searched map from the searching unit while displaying the searched map on the home page or the virtual store.

According to another aspect of the present invention, the dealer capable of dealing or mediating the merchandise is a convenience store and the dealer information contains advertising information concerning the outline of the convenience store, merchandise and service.

According to a further aspect of the present invention, there is provided a method of ordering and delivering merchandise by accepting order of merchandise from any customer through a home page or a virtual store concerning sales of merchandise and constructed on a network by a sales merchant and through the network and delivering the ordered merchandise to a delivery destination designated by the customer so that the delivery destination of the merchandise can be selected by the customer, the method comprising the steps of: when a specific dealer is to be selected as a delivery destination of merchandise by the customer in accepting an order of merchandise from the customer through a terminal, searching for a map having at least one dealer in the neighborhood of the delivery destination in the region of the map on the basis of address information input by the customer; displaying the map of search results on the home page or the virtual store; and determining the specific dealer to be selected by the customer as a delivery destination of the merchandise based on the displayed map.

According to a still further aspect of the present invention, a delivery schedule is determined and prepared on the basis of the condition of a contract with reference to delivery schedule models preliminarily determined in consideration of delivery schedules determined on the basis of past data when the contract is made with respect to the merchandise, and schedule management is performed periodically by electronic mail while monitoring whether inspection information exists in a specified period when the dealer exists.

According to the present invention, a customer can select an optimum dealer as a delivery destination of merchandise on the basis of the newest real-time information concerning dealers such as convenience stores when the customer orders the merchandise. Hence, the customer can receive the merchandise through the optimum dealer at the customer's convenience. On the other hand, there is expectation that the sales merchant can secure the customer by improvement of merchandise delivery service. Particularly because a dealer convenient for both the customer and the sales merchant is determined as a delivery destination of the merchandise, a regular service can be used. Hence, delivery business can be simplified compared with delivery to the private address of any customer, so that reduction in cost can be achieved.

Moreover, the dealer such as a convenience store can intend to secure the customer because there is expectation that the customer coming to the dealer to receive the delivered merchandise may buy other merchandise or service dealt by the dealer. Moreover, an advertising effect can be expected because the opportunity of providing information of the dealer such as a convenience store itself to the customer increases when the customer orders and receives merchandise.

In addition, when schedule management is performed periodically by electronic mail, the system and method of ordering and delivering merchandise can be provided as that in which management is not so complex to the sales merchant that lowering of service is not brought.

BRIEF DESCRIPTION OF THE DRAWINGS

FIG. 12 is a view showing one example of the operational display scenes depicted in FIG. 5;

FIG. 13 is a view showing one example of the operational display scenes depicted in FIG. 5.

DESCRIPTION OF THE EMBODIMENTS

Specific embodiments of a merchandise ordering and delivering system according to the present invention will be described hereunder with reference to the drawings.

Description will be made about a system in which an electronic mall composed of virtual stores is opened on a network as a system of selling merchandise by Internet, so that an order of merchandise from an individual person or client is accepted and the merchandise is delivered to the customer.

Figure 1:
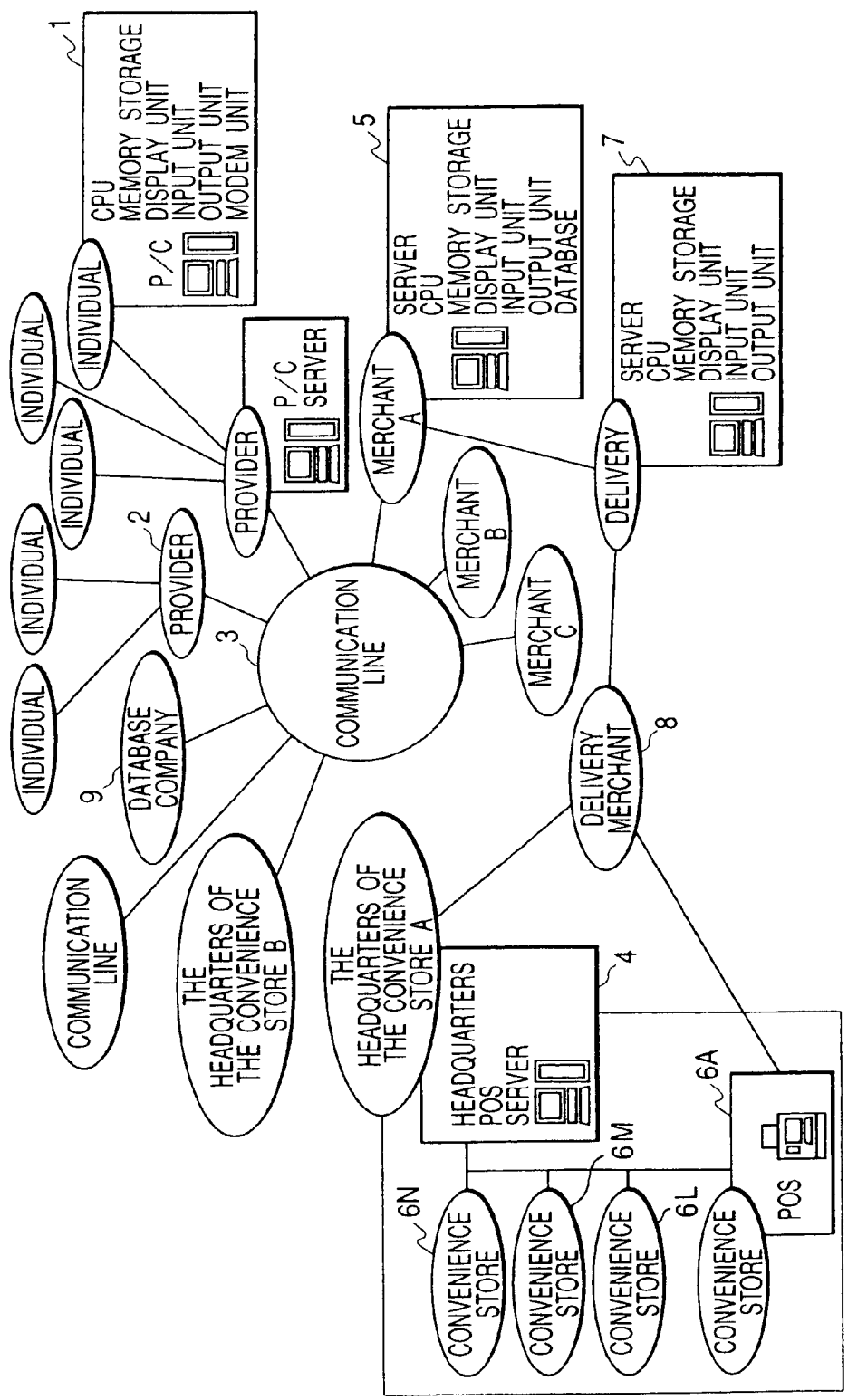
FIG. 1 is a block diagram showing a system of ordering and delivering merchandise according to an embodiment of the present invention.

FIG. 1 is a block diagram showing an example of overall configuration of the present invention. Each of individual (client) terminals 1 is constituted by a personal computer. The personal computer is connected to a provider 2 by using a modem unit, or the like, so that the personal computer can make access to a network 3 such as Internet. A computer system 4 of the headquarters of convenience stores A which may alternatively be depositories and a sales management computer system 5 of each sales merchant are also connected to the network 3.

The computer system 4 of the headquarters of convenience stores A is connected to terminals 6 (6A to 6N) of a group of convenience stores through a network for private use in the group of convenience stores A. Computer systems 4A to 4N of a plurality of headquarters of convenience stores A to N are connected to the private network. Sales management computer systems 5A to 5N of a plurality of sales merchants (A to N) are also connected to the network 3. The sales management computer system 5 of each of the sales merchants is connected to a delivery management computer system 7 through a private network and further connected to a computer system 8 of a delivery merchant and to a private network of convenience stores. A computer system 9 of a database company for providing various kinds of information such as map information is also connected to the network 3.

A terminal which has a function equivalent to that of each individual (client) terminal 1 and which can be used freely by any client is also set as each of the terminals 6 (6A to 6N) of the convenience stores. The terminal 6 has a CPU, an input unit, a display unit, a memory storage, a printer, a camera, etc. in its body.

Each of the other terminals and computer systems also has a CPU, an input unit, a memory storage, a printer, a display unit, a communication controller, an I/O control unit, etc. Each of the computer systems and terminals of the convenience stores further has a POS system. The input unit includes an input panel and an auxiliary input unit. The input panel and the display unit make a pair serving as a touch screen.

The memory storage stores various kinds of programs and various kinds of commands executed for display control, printing control, communication control, etc. by the CPU, map information containing convenience store information and data containing display attributes. The memory storage further stores various kinds of data input through the input unit and data received through the communication controller.

Operation, scale-up, scale-down, movement, change, etc. of the display screen can be made as operations concerning display screen control. When, for example, a menu, an icon, or the like, concerning selection of a delivery destination is clicked with a mouse, a pop-up menu concerning a map containing convenience store information is displayed. One menu can be selected from the pop-up menu and necessary data can be input on the basis of the selected menu or a lower-rank menu is further displayed on the selected menu.

Each of the sales management computer system 5 of the sales merchant and the computer system 4 of the headquarters of the convenience stores has an electronic mall function and provides a unique home page concerning merchandise.

Figure 2:
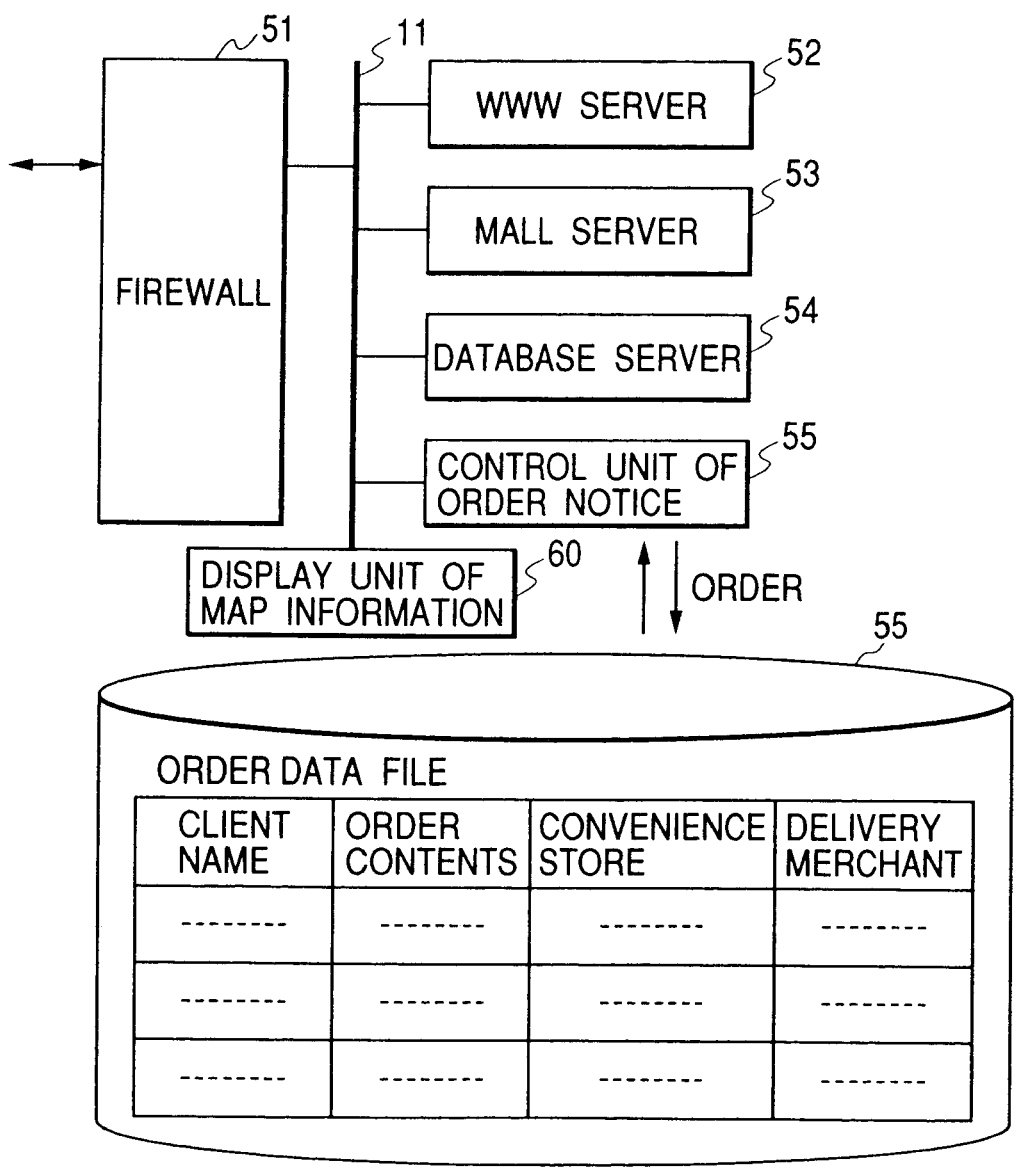
FIG. 2 is an explanatory diagram of an electronic mall of FIG. 1.

FIG. 2 shows an example of the electronic mall as a management terminal unit provided by the computer system 5 and forming virtual stores on the network 3. The electronic mall is constituted by a firewall 51 for sales merchants connected to the network, a WWW server 52, a mall server 53, a database server 54, a database containing order data files 55 provided in the database server, a control unit 56 of order notice, and a display unit 60 of map information containing map information files.

Figure 3:
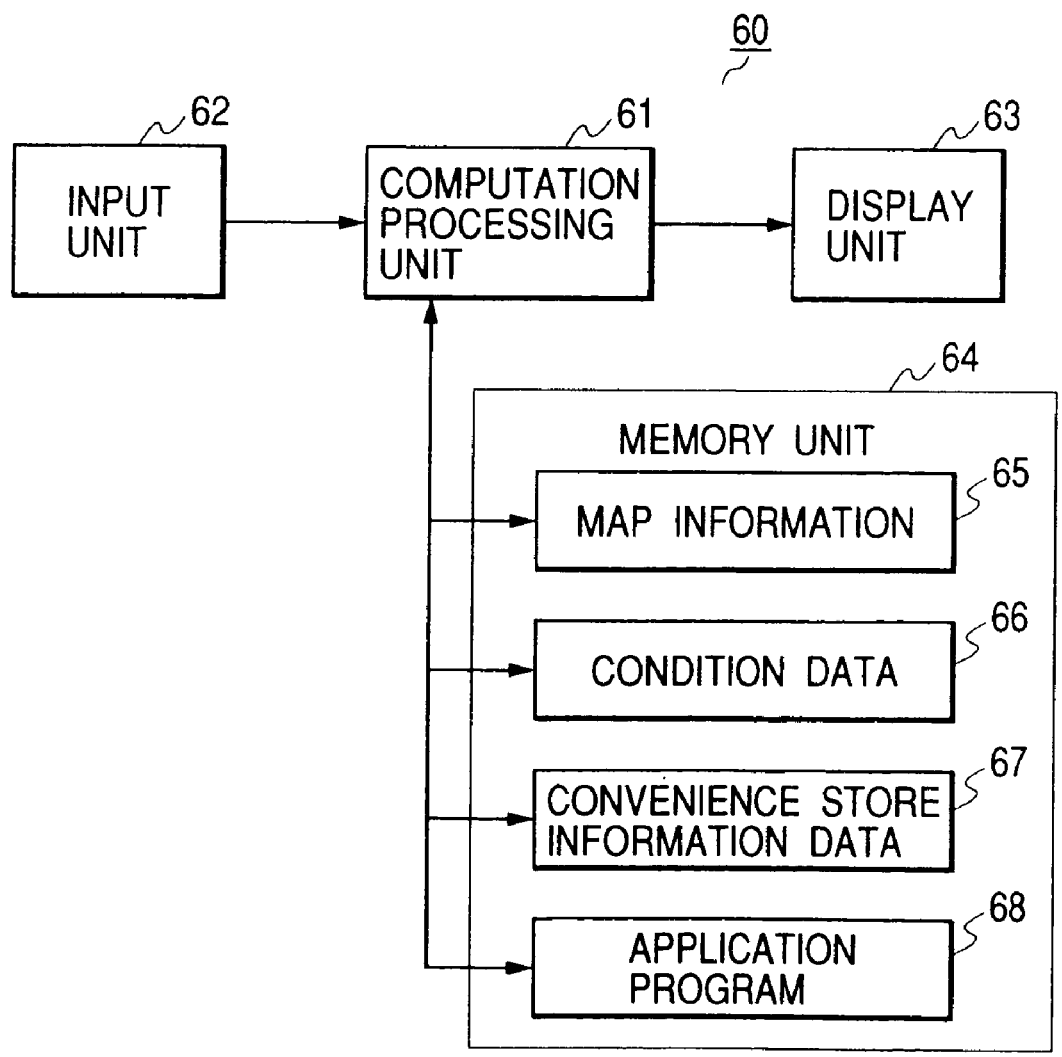
FIG. 3 is a diagram showing an example of configuration of the map information display unit 60 depicted in FIG. 2.

FIG. 3 shows an example of configuration of the map information display unit 60 of the computer system 5. The map information display unit 60 displays a map of the neighborhood of the client address inclusive of the address of a convenience store on the home page on the basis of the address and telephone number of the client when the convenience store is selected as a place where merchandise will be received by the client. The map information display unit 60 is constituted by a computation processing unit 61, an input unit 62, a display unit 63, and a memory unit 64. The memory unit 64 contains a map information unit 65 for holding map information, a condition data unit 66 for giving a condition for retrieving each map on the basis of address, telephone number, etc., a dealer information unit 67 for storing dealer information such as a group of convenience stores as dealers capable of dealing or mediating merchandise, addresses of the convenience stores, advertising information, etc., and a map retrieval application program 68 for retrieving a map containing the address of a convenience store of a neighborhood of the client on the basis of the address information such as address, postal code, etc., given by the client to display the map on the display unit 63.

The map information unit 65 holds systematized digital (numerical map) or image data of maps with a scale of 1 to 2500, 1 to 5000, or the like, covering respective regions of the whole country or of maps covering wider or narrower regions (for example, so-called residence maps or road maps available) as map information. The map information contains, at least, a map expressing roads, place names, town names, buildings, etc. Two-dimensional coordinate management is performed with an optional place of the map as its origin so that coordinates (x, y) are given to each point on the map. The map information is preserved in the memory unit 64 so that a partial map of a specific zone in the map information can be displayed on the display unit 63 and that coordinates are uniquely given to each point on the map.

It is preferable to use available maps, which contains buildings or names of convenience stores serving as dealers, as the map information with no change given to the maps. It maybe, however, difficult to obtain available map information containing the newest or updated convenience store information always accurately. Therefore, data of positional information, store names, etc., corresponding to coordinates (x, y) on the map are prepared as address data of convenience stores capable of dealing or mediating merchandise in connection with the aforementioned map information. The data are held in the dealer information unit 67. On the display unit 63, a convenience store is displayed so as to be superposed on a map of a region designated by coordinates (x, y) as a key.

The newest map information is successively fetched as the map information from the database company through the data network 3. Map information may be always retrieved through Internet so that the map information unit 65 may be omitted or the capacity of the memory unit 64 may be reduced.

The advertising information concerning the outline of the convenience store, merchandise and service is input through the computer system or the terminal 6 of the headquarters of the convenience store. The advertising information is stored as dealer information in the dealer information unit 67. The advertising information is displayed together with the convenience store name, or the like, on the home page when the user selects the convenience store.

The WWW server 52 is a unit for controlling transmission of information, acceptance of data from the customer, or the like, by operating a program called CGI (common gateway interface) described in an HTTP protocol. The WWW server 52 sends merchandise information of the individual (client) requesting the mall server 53, from the database to the network. The database server 54 is a unit for processing order information received from the client and storing the order information in the order data file 55. The order notice control unit 56 is a unit for preparing information concerning the ordered merchandise as a notice and sending the order notice to the convenience store and to the delivery merchant through the dedicated network.

At the terminal in the sales merchant, after the order information received from the client by the WWW server 52 is stored together with the order number in the order data file 55 in the database, these kinds of information are picked out collectively in suitable timing and sent as a notice to the terminals in the client, each delivery merchant and the convenience store through the dedicated network.

The client receives merchandise information in the database of the sales merchant from the home page. When the client orders merchandise to the home page by operating the client terminal 1, the contents of the order are stored in the order data file 55 in the database of the sales merchant. For example, the client name, the order contents, the names of the convenience store and delivery merchant dealing the merchandise, or the like, are stored in the order data file 55.

On the other hand, when such order information is stored in the order data file 55, the order notice control unit 51 prepares a notice and sends the notice to the convenience store and to the delivery merchant through the dedicated network in suitable timing.

At the respective terminals in the convenience store and the delivery merchant, the notice 5 is displayed on the display unit and printed out by the printer. Upon reception of the notice, the delivery merchant prepares for delivery of necessary merchandise and performs the work of forwarding the merchandise to a relevant convenience store.

Figure 4:
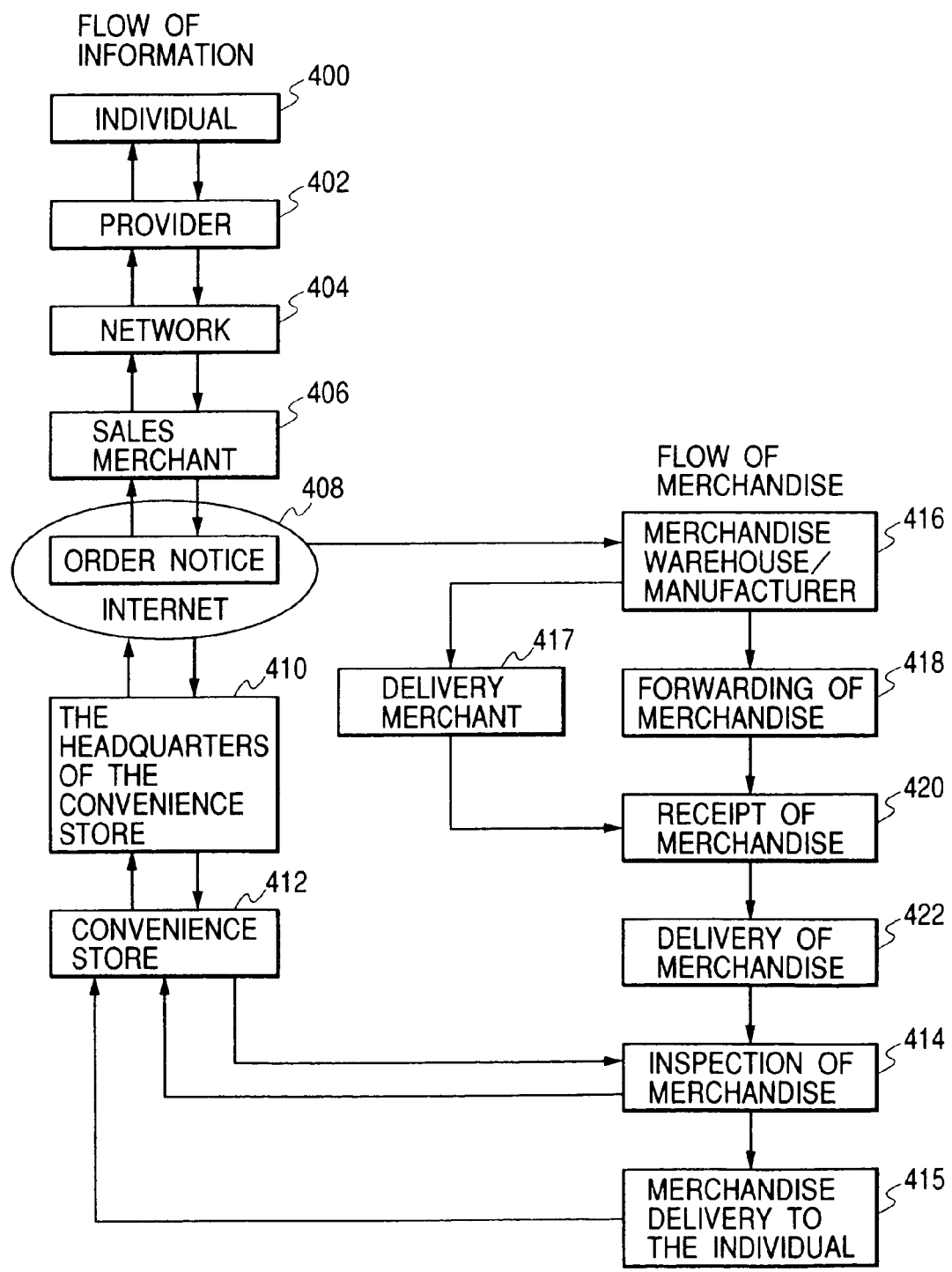
FIG. 4 is a flow chart for explaining the relation between a flow of "information" concerning order and delivery of merchandise and an actual flow of merchandise in the merchandise ordering and delivering system according to the present invention.

The relation between a flow of "information" concerning order and delivery of merchandise in the merchandise ordering and delivering system according to the present invention and an actual flow of the merchandise will be described below with reference to the flow chart of FIG. 4. The individual (client) makes access through the network 3 from the provider 2 including the terminal 1 or from the server of the headquarter of the convenience store including the terminal 6 to the home page by using the his (or her) own terminal 1 or the terminal 6 in any convenience store. The individual (client) watches merchandise information presented in the home page and orders merchandise of the sales merchant. That is, the client makes access to the home page on Internet (steps 400 and 404), watches merchandise information introduced by the home page and orders merchandise of the sales merchant (step 406). When the client orders merchandise, the client designates the method of receiving the merchandise.

Then, the order request is sent to the WWW server 52 of the sales merchant through Internet by an HTTP protocol. The WWW server 52 processes the order request by operating a program called CGI described in the HTTP protocol.

The CGI thus operated does not make any processing on the WWW server but transfers all data output from the browser used by the client to the mall server 53. At the terminal in the sales merchant, the data received by the mall server 53 are interpreted so that only the order information is sent to the database server 54 and written into the order data file 55. Various kinds of information noticed by the client, such as merchandise code, the number or quantity of merchandise, the amount of money, the name and telephone number of the client, that is, the buyer, the method of receiving the merchandise, and so on, are written together with the order number in the order data file 55.

The order information is sent to the forwarding management computer system 7 of the merchandise warehouse connected to the sales management computer system 5 through the dedicated network or is sent directly to the management computer of the manufacturer dealing with the sales merchant (step 416).

Then, preparation is made for forwarding merchandise from the merchandise warehouse of the sales merchant or from the manufacturer through a specific delivery merchant (inclusive of a delivery section of the sales merchant or the manufacturer) in accordance with the designated merchandise receiving method. If the designation of reception of the merchandise is a convenience store, preparation is made for forwarding the merchandise to the convenience store (step 418). The order notice control unit reads predetermined data from the order data file 55 and sends a notice of a predetermined format to the designated convenience store through the headquarters of the convenience store (steps 410 and 412). In this embodiment, a notice of a predetermined format for the delivery merchant is sent to the management computer system of the merchandise warehouse/manufacturer (step 419). The delivery merchant delivers the merchandise to the designated convenience store with reference to the map information, etc. of the database company connected to the network 3 if necessary (steps 420 and 422). Although this embodiment has been described upon the case where the delivery merchant delivers the merchandise to the designated convenience store directly, the present invention may be applied also to the case where the delivery merchant delivers the merchandise to the distribution center of convenience stores. In this case, the delivery merchant may deliver ordered merchandise to the distribution center collectively.

Before the delivery merchant delivers the merchandise, the aforementioned notice is given to the convenience store terminal 6. The convenience store inspects the merchandise delivered by the delivery as to whether the merchandise is just one fit to the order information, and makes contact with both the client and the sales merchant to inform them of the arrival of the merchandise (step 414). Then, the merchandise is delivered to the client in the convenience store (step 415) and a copy of a delivery voucher is handed over to the sales merchant.

Incidentally, when the destination of reception of the merchandise is not the convenience store, the merchandise is delivered by an ordinary method.

Figure 5:
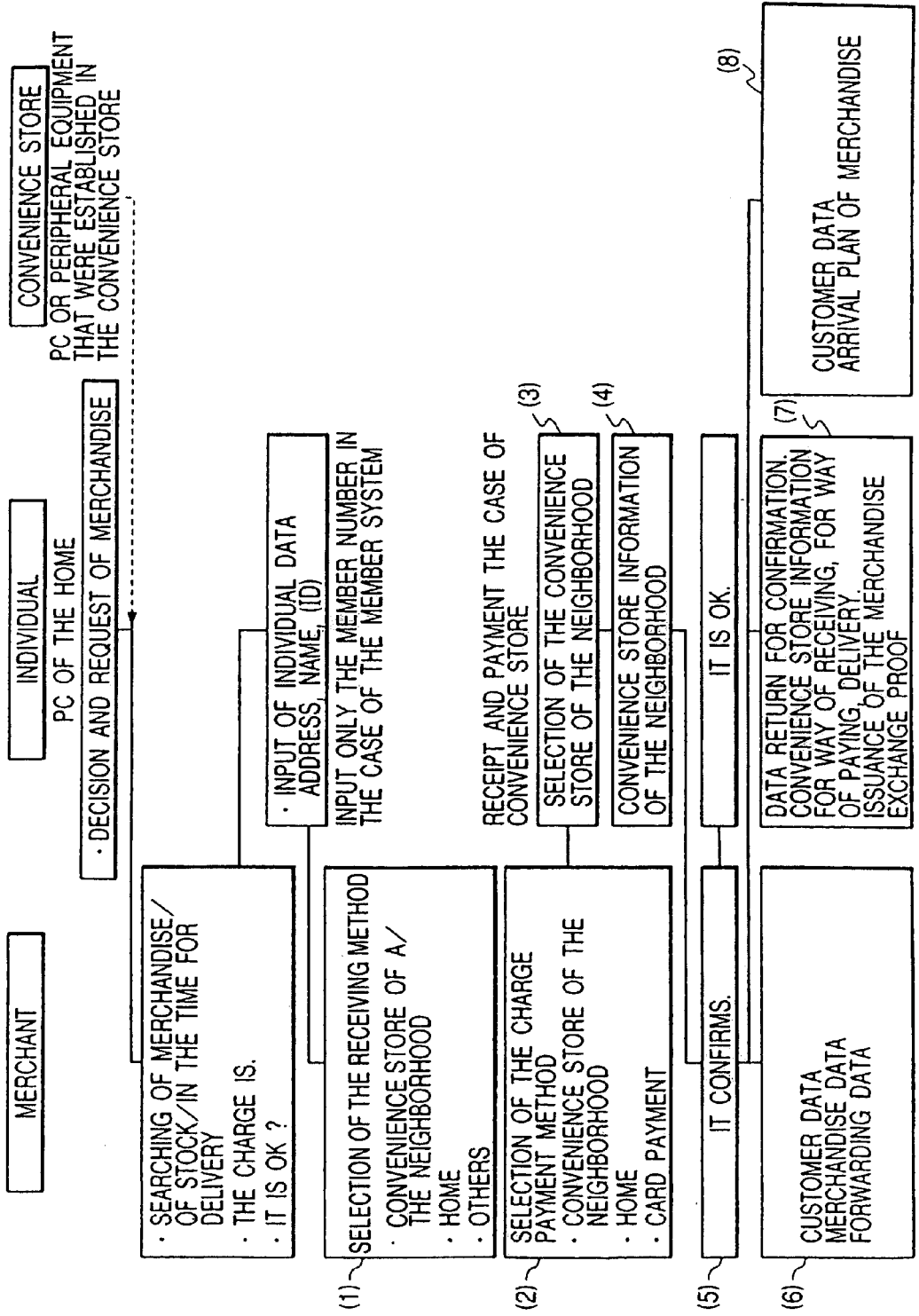
FIG. 5 is a flow chart showing the respective operations by a customer himself or herself, a sales merchant in a convenience store.

A flow of operations and processing display screens will be described below with reference to FIGS. 5 through 13 when order of merchandise is performed from the individual (client) terminal 1 or from each convenience store terminal 6. FIG. 5 is a flow chart showing the operations of the client himself or herself, the sales merchant and the convenience store. FIGS. 6 to 13 show examples of the operating screens respectively.

First, the client makes access to the home page on Internet, watches merchandise information introduced by the home page and orders the merchandise of the sales merchant. When the client orders the merchandise, the client confirms the stock of the merchandise, the time for delivery, the merchandise code, the number or quantity of merchandise, the amount of money, the telephone number, and so on. Then, the client inputs data of the client, that is, buyer name, address and ID. In the case of a membership system, only membership number may be used as the data of the client. These operations can be made on a very general operating screen. The description of the operating screen will be omitted here.

Figure 6:
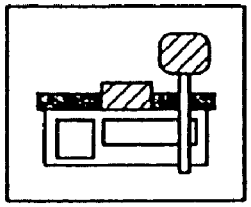
FIG. 6 is a view showing one example of the operational display scenes depicted in FIG. 5.
Figure 7:
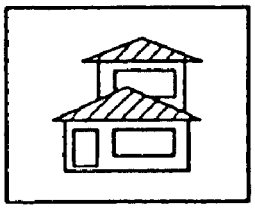
FIG. 7 is a view showing one example of the operational display scenes depicted in FIG. 5.

Then, the screen on the home page goes to a screen concerning reception of merchandise. For example, in this embodiment, a screen for selection of the way of receiving merchandise as shown in FIG. 6 is displayed. In this example, (1) convenience store, (2) home and (3) others are displayed as the place where the merchandise will be received. Then, the screen goes to a screen concerning the way of paying the charge. For example, as shown in FIG. 7, (1) convenience store, (2) home and (3) card are displayed as the way of paying the charge. The case where the convenience store is selected both as the place of reception of the merchandise and as the way of paying the charge will be described below.

The display screens shown in FIGS. 6 and 7 are displayed after the selection of merchandise. In each of the display screens, a return button 551 for canceling the operation of the current display screen to return the operation to the previous display screen and an OK button 552 for deciding the selected operating button to make the operation go to the next operation are provided in a lower portion of the screen. The further next display screen is displayed by the operation of the OK button, so that various kinds of information can be input interactively.

When (1) convenience store is selected as the place of reception of the merchandise in FIG. 6 and the way of paying the charge is decided in FIG. 7, a map containing information of a dealer of a neighborhood of the client address such as a convenience store capable of dealing or mediating the merchandise is displayed on the basis of the map information, the dealer information and the address information such as address, telephone number, postal code, etc. of the client.

The client can select the most convenient convenience store used usually by the client from the dealers capable of dealing or mediating the merchandise taking the client's knowledge into consideration. If there is no convenience store wanted by the client in the region of the displayed map, a map of an adjacent or higher-rank region is displayed by the client's operation. Incidentally, though there is a convenience store wanted by the client in the region of the displayed map, there is a possibility that the map information or the dealer information do not contain convenience stores newly opened or closed recently. A database-containing retrieval system in which accurate information of the convenience store can be retrieved by designating the name of the convenience store of the specific group or the address of the convenience store may be provided to prepare for the case where convenience stores opened newly recently are not displayed on the map.

Figure 8:
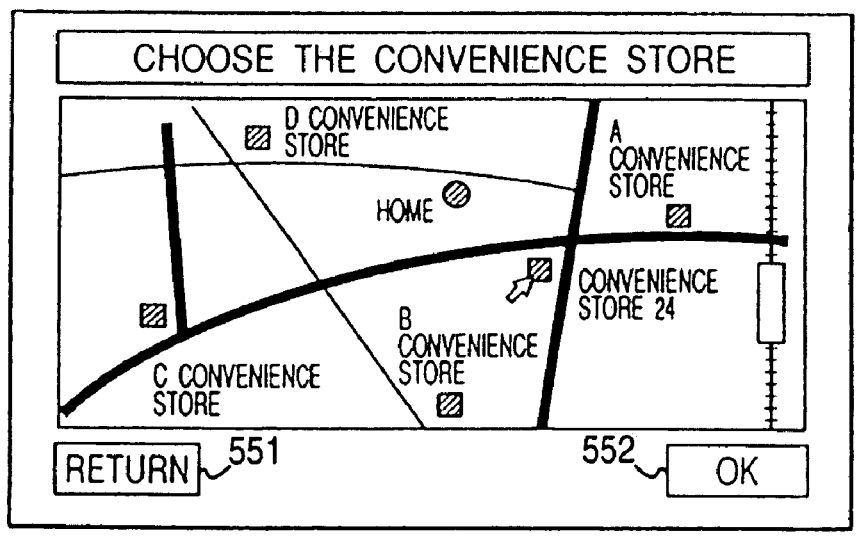
FIG. 8 is a view showing one example of the operational display scenes depicted in FIG. 5.

In this embodiment, dealers capable of dealing or mediating the merchandise as shown in FIG. 8 are displayed so as to be made conspicuous, for example, by highlight display, or the like, on the map of the neighborhood of the client address. The user (client) can designate a dealer capable of mediating the merchandise, such as a convenience store (coordinates x and y on the screen), by clicking a specific convenience store with a mouse, or the like, or by touching the display unit of the touch panel.

Figure 9:
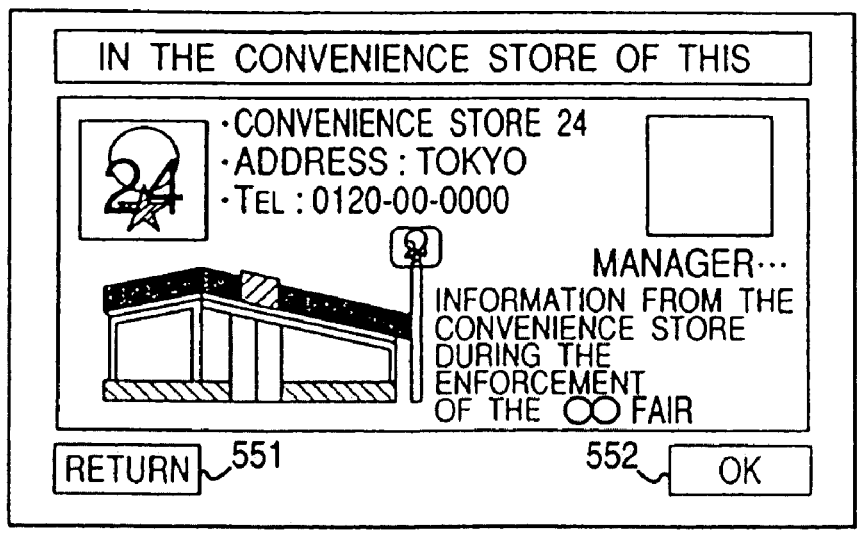
FIG. 9 is a view showing one example of the operational display scenes depicted in FIG. 5.

The map information display unit 60 extracts the name and address data of the convenience store as a dealer capable of mediating the merchandise and designated on the basis of the map information or extracts the code number of the convenience store on the basis of the aforementioned operation. At the same time, the map information display unit 60 calls outline data of the convenience store such as image data as shown in FIG. 9 from the map information file to thereby display the data on the display screen. In this embodiment, detailed data of the convenience store serving as a dealer capable of mediating the merchandise are stored in the map information display unit 60. Hence, when the client selects a specific convenience store, the client can check whether the designated convenience store is selected without mistake because information such as the address, photograph, or the like, of the convenience store is displayed as shown in FIG. 9.

At the same time, advertising information of the selected convenience store is displayed on the screen on the home page. Hence, the user can buy merchandise of the convenience store or can receive the provision of a service on the basis of the advertising information.

Figures 10, 11:
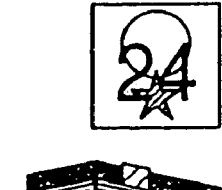
FIG. 10 is a view showing one example of the operational display scenes depicted in FIG. 5.
FIG. 11 is a view showing one example of the operational display scenes depicted in FIG. 5.

When the OK button is further selected in the display screen shown in FIG. 9, a display screen for final confirmation as shown in FIG. 10 is displayed. On the display screen for confirmation, information input up to now is displayed in the form of final confirmation. If there is any mistake in this stage, the client can correct the mistake by selecting the return button. A correction button may be provided on the display screen so that predetermined data can be corrected while a data correction screen is displayed by the selection of the correction button.

When the client gives OK on the confirmation screen shown in FIG. 10, the data concerning the place of reception of the merchandise and the way of paying the charge are written together with the other information containing the order number in the order data file 55 at the terminal of the sales merchant.

Then, confirmation data as shown in FIG. 12 are returned as a notice to the client. The client confirmation data contain information concerning the place of reception of the merchandise, the way of paying the charge and the convenience store for reception. Further, a certificate equivalent to a merchandise exchange proof is issued. The client can select the destination of reception of the merchandise from a plurality of choices containing the convenience store of the neighborhood when the client orders the merchandise. Hence, even in the case where the client is away from home most of the time, the client can receive the merchandise at his or her convenience of 24 hours on the basis of the client confirmation data if the convenience store of the neighborhood is used. Even in the case where the client is at home for a long time, the client may have to be away from home on urgent business. The client, however, can receive the merchandise at his or her convenience without anxiety because the convenience store of the neighborhood once receives the merchandise if the convenience store is designated.

Customer data, merchandise data and forwarding data as shown in FIG. 11 are prepared as a notice and issued to the sales merchant. There is expectation that the sales merchant can secure the customer by improvement of merchandise delivery service. Moreover, because the delivery destination of the merchandise is the convenience store, a regular service can be used. Hence, delivery work can be simplified to thereby achieve reduction in cost compared with delivery to the individual address. Moreover, the number of deliveries for the absence of the customer can be reduced to thereby achieve efficiency in delivery and reduction in cost.

Further, customer data and merchandise arrival plan data as shown in FIGS. 11, 12 and 13 are prepared as a notice and issued to the convenience store. FIG. 11 shows an example of the notice screen or specification for the merchandise warehouse/manufacturer or the delivery merchant. FIG. 12 shows an example of the notice screen or specification for the customer. The notice for the merchant or the convenience store in FIGS. 11 and 13 is displayed on the display screen of the terminal and output periodically from the terminal as occasion demands. The notice for the customer in FIG. 12 is output automatically at the time of the completion of updating, so that an output sheet can be used as a merchandise receipt. In this embodiment, the map information, the outline of the convenience store, the advertisement of the convenience store, and so on, can be displayed on the output screen in FIG. 12 with reference to the detailed data of the convenience store stored in the map information display unit 60. Hence, the opportunity of providing the information of the convenience store itself increases so that an advertising effect can be expected. In the convenience store, there is expectation that the client coming to the convenience store to receive the delivered merchandise may buy other merchandise of the convenience store to thereby achieve the security of the customer. Moreover, when the client orders and receives the merchandise, the opportunity of providing the information of the convenience store itself increases, so that an advertising effect can be expected.

Figure 14:
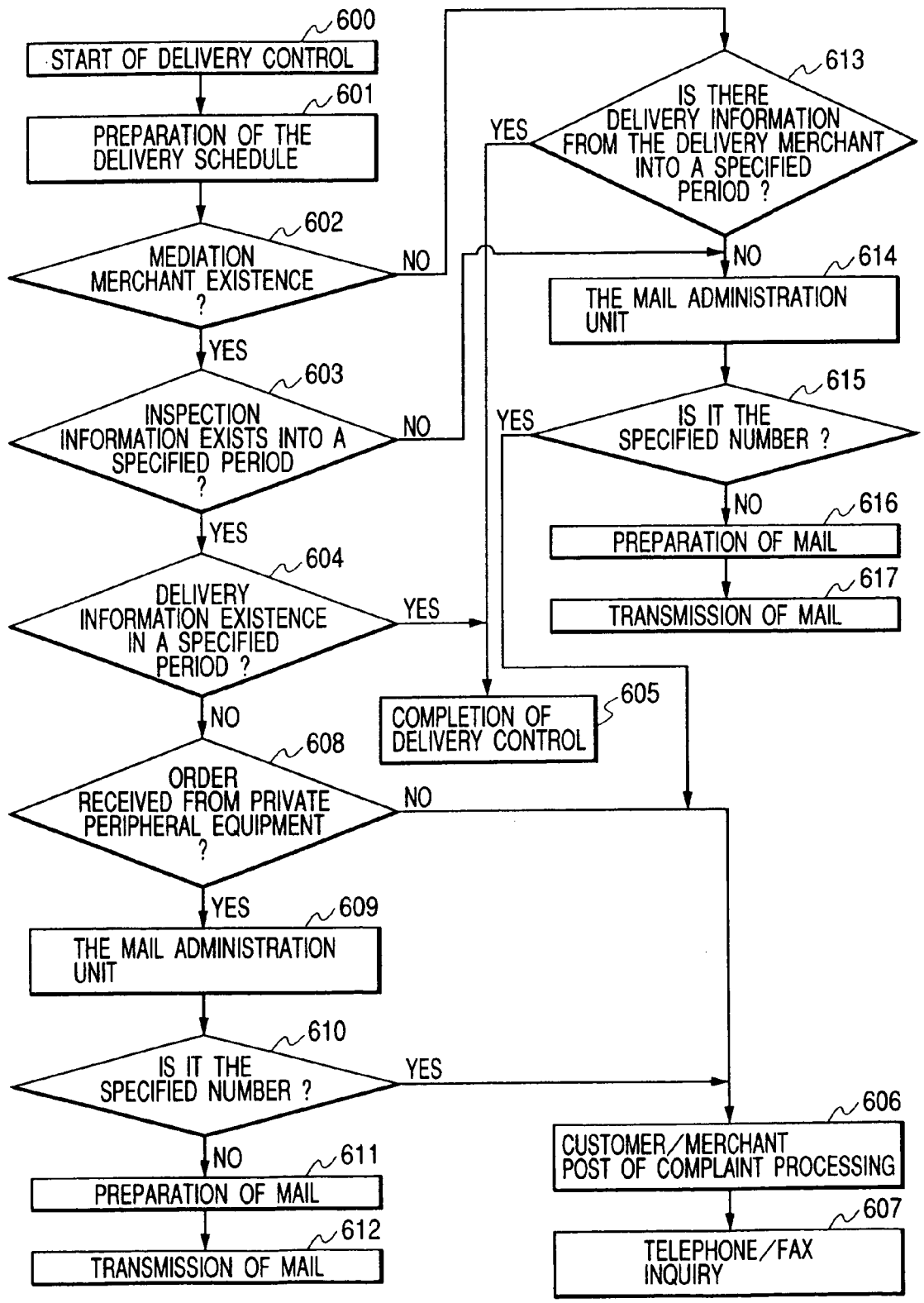
FIG. 14 is a flow chart showing a schedule management system in the present invention.

A schedule management system used in the system according to the present invention will be described hereunder. In this embodiment, a schedule management system is introduced so that inspection data are obtained from the convenience store or data are obtained from the merchandise warehouse/manufacturer and the delivery merchant, if necessary, in order to manage the delivery day promised to the client. FIG. 14 shows a flow chart of the schedule management system.

When a contract is made, the mall server 53 first determines and prepares a delivery schedule on the basis of a contract condition with reference to delivery schedule models preliminarily determined in consideration of delivery schedules determined on the basis of the past data (schedules due to difference in place, merchandise to be delivered, and so on) (step 601). Schedule management is executed periodically on the basis of the delivery schedule.

That is, when there is no mediating merchant on the basis of the judgment in step 602 as to whether the request is to be mediated by the convenience store or not, that is, when the delivery merchant is to deliver the merchandise to the customer directly, this system judges whether there is delivery information from the delivery merchant in a specified period or not (step 613). If there is delivery information from the delivery merchant in the specified period, the delivery management is terminated (step 605). If there is no delivery information in the specified period, data are sent to an electronic mail administration unit (step 614). In this embodiment, the electronic mail administration unit is provided in the sales management computer system. The number of inquiries is counted as a specified number by the electronic mail administration unit (step 615). When, for example, the specified number is two, data are sent to the post of customer's complaint processing (step 606), so that a member of the post inquires of the merchant by telephone directly or by facsimile (step 607). If the number of inquiries is within the specified number, an electronic mail is prepared by a predetermined format (step 616) and sent to the merchant (step 617). In this manner, a slight lag is processed mechanically while a large obstacle is solved manually.

If there is a mediating merchant in the step 602, monitoring is made as to whether inspection information exists in a specified period or not (step 603). If there is no inspection information in this case, the absence of inspection information is sent to the electronic mail administration unit to perform the work of preparing an electronic mail (step 614).

If there is inspection information, monitoring is made as to whether delivery information exists in a specified period or not (step 604). If there is delivery information in this case, the delivery management is terminated (step 605).

If there is no delivery information in the step 604, a judgment is made as to whether order is received from the dedicated peripheral equipment of the customer or not (step 608). If there is no request from the dedicated peripheral equipment, data are sent to the post of customer/merchant complaint processing (step 606) to urge the customer to receive the merchandise by telephone or facsimile manually (step 607).

If the step 608 judges that the request is from the dedicated peripheral equipment, data are sent to the electronic mail administration unit. In the electronic mail administration unit, the same process as explained in the steps 615, 616, 617, 606 and 607 is performed in the steps 609 to 612 and in the steps 606 and 607.

Incidentally, in the aforementioned embodiment, convenience stores serve as dealers capable of dealing or mediating merchandise. However, the dealers may be stores or sales departments in other categories of business if the dealers can cover the whole country in a wide range and in detail and can be open for business for a long time. For example, gas-station chain stores, or the like, may be used as the dealers.

Incidentally, the present invention is not limited to the aforementioned system for selling merchandise by Internet. The present invention can be widely applied also to a system in which a customer orders merchandise interactively and receives the merchandise in a dealer.

As described above, in accordance with the present invention, there can be provided a merchandise ordering and delivering system in which a dealer optimal to a customer can be selected on the basis of the newest dealer information when the customer selects the dealer, such as for example a convenience store of a neighborhood, as a merchandise relay station.

Moreover, when the customer orders and receives the merchandise, the opportunity of providing advertising information of the dealer such as the convenience store itself increases, so that an advertising effect can be expected.

In addition, when schedule management is executed periodically by use of electronic mail, the management is not made complex to the sales merchant. Hence, a system and method for ordering and delivering merchandise without lowering of service can be provided.

What is claimed is:

1. A method of ordering and delivering merchandise using a computer system opening virtual stores on a network, said computer system comprising: a server; a memory unit storing merchandise information, selection information about user's merchandise reception, dealer information and delivery schedule information and including an order data file for storing orders from customers; and a map information display unit for displaying a map concerning dealers, said method comprising the steps:

in said server, accepting access to said virtual store from a user terminal connected to the server through the network;

providing merchandise information stored in said memory unit to said user terminal through the network;

accepting an order of merchandise from the user on the basis of said merchandise information and writing the accepted merchandise order in the order data file;

reading selection information concerning a way of receiving said ordered merchandise from said memory unit to provide the read selection information to said user terminal through the network;

accepting a way of receiving merchandise selected based on said read selection information from said user terminal to write the selected receiving way in said order data file;

determining that the selected receiving way indicates dealers capable of dealing or mediating merchandise as a delivery destination and retrieving map information by said map information display unit based on dealer information stored in said memory unit to provide any dealers among the retrieved map information to said user terminal that may be selected by said user, said map information including a dealer of a neighborhood of the delivery destination in the region of said map on the basis of a user's address or an address input by said user;

accepting a specific dealer selected among the dealers in said provided map information from said user terminal through the network to write the accepted specified dealer in said data file;

providing the user terminal with confirmation information including the way of receiving merchandise to the user terminal through the network based on said order information;

determining that a contract of sales regarding said ordered merchandise is made and preparing a delivery schedule on the basis of a condition of the contract by referring to information on past delivery schedules stored in said memory unit;

determining that said receiving way indicates a dealer and reading out order information written in said order data file and sending a notice of a predetermined format including information of a merchandise arrival schedule to said dealer based on which arrival of the ordered merchandise is informed to a sales merchant, to a terminal of said dealer; and monitoring whether inspection information indicating that said ordered merchandise has arrived at said dealer is received from said dealer terminal through a communication line in a predetermined period based on said delivery schedule.

2. A method of ordering and delivering merchandise according to claim 1, comprising determining that said merchandise inspection information exists and monitoring whether delivery information indicating that the merchandise has been handed over to the user at said dealer is received from said dealer in said predetermined period through the communication line.

3. A method of ordering and delivering merchandise according to claim 1, wherein when said specified dealer is selected, an outline data including an address and photograph of said specified dealer is provided to said user terminal based on said dealer information.

4. A method of ordering and delivering merchandise using a computer system, said computer system comprising a server and a map information display unit for displaying a map concerning dealers, said method comprising:

provide, in said server, merchandise information stored in a database on a network;

accepting, in said server, an order of merchandise offered from a user who has accessed said merchandise information on the network from a user terminal together with user information and storing the accepted merchandise order and the user information in a data file;

reading out, in said server, a display screen of selection information concerning a way of receiving said ordered merchandise from said database, said selection information including information of dealers from which reception of ordered merchandise is available;

rendering, in said server, the user to input a selected one of said available dealers;

displaying, in said map information display unit, a selection display screen including the read-out information of said dealers and a selection display screen including information concerning charge payment dealer on a display unit, determining, in said map information display unit, that selected receiving dealer information is inputted and displaying a display screen of map information on the display unit based on the map information stored in said database to provide any dealers among the retrieved map information to said user terminal that may be selected by said user, said map information including merchandise receiving dealers of a neighborhood of the delivery destination in the region of said map on the basis of a user's address or an address input by said user;

accepting, in said map information display unit, a specific dealer selected among the receiving dealers in said provided map information from said user terminal to display information of said accepted specific dealer on a screen of the display unit from a map information file to provide the display screen of the specific dealer information to said user terminal;

storing, in said server, information concerning said specific dealer and charge payment dealers in the data file;

determining, in said server, that a contract of sales regarding the ordered merchandise is made and reading out order information written in said order data file and sending a notice of a predetermined format including information of a merchandise delivery schedule based on which arrival of the ordered merchandise is informed to a sales merchant, to a terminal of said specific dealer;

preparing, in said server, a delivery schedule on the basis of a condition of the contract by referring to information on past delivery schedules stored in said database;

storing, in said server, the prepared delivery schedule in the data file;

sending, in said server, the delivery schedule to a terminal of said specific dealer from which the user is available to receive the ordered merchandise;

monitoring, in said server, whether inspection information indicating that said ordered merchandise has arrived at said dealer is received from said dealer terminal through the network in a predetermined period based on said delivery schedule; and providing, in said map information display unit, the user terminal with the stored or input order of merchandise, user data, concerned dealer information and delivery schedule as confirmation display screen by displaying the same in the display unit to allow the user to provide confirmation information.

5. A method of ordering and delivering merchandise using a computer system according to claim 4, wherein said concerned dealer information displayed in said map information display unit which has accepted selection of dealer from which the ordered merchandise is received from said user terminal is outline data including picture data of the concerned dealer, and said information provided to said user terminal as the confirmation display screen by said map information display unit includes the outline data of the concerned dealer and the information of the charge payment dealer.

* * * * *